(12) United States Patent
Sommansson et al.

(10) Patent No.: US 11,174,810 B2
(45) Date of Patent: Nov. 16, 2021

(54) SYSTEM AND A METHOD FOR DIAGNOSING THE PERFORMANCE OF TWO NOX SENSORS IN AN EXHAUST GAS PROCESSING CONFIGURATION COMPRISING TWO SCR UNITS

(71) Applicant: Scania CV AB, Södertälje (SE)

(72) Inventors: Joakim Sommansson, Grödinge (SE); Fredrik Strååt, Stockholm (SE)

(73) Assignee: Scania CV AB, Södertälje (SE)

( * ) Notice: Subject to any disclaimer, the term of this patent is extended or adjusted under 35 U.S.C. 154(b) by 236 days.

(21) Appl. No.: 16/316,304

(22) PCT Filed: Jul. 6, 2017

(86) PCT No.: PCT/SE2017/050756
§ 371 (c)(1),
(2) Date: Jan. 8, 2019

(87) PCT Pub. No.: WO2018/013039
PCT Pub. Date: Jan. 18, 2018

(65) Prior Publication Data
US 2021/0033041 A1    Feb. 4, 2021

(30) Foreign Application Priority Data
Jul. 14, 2016  (SE) ................... 1651061-2

(51) Int. Cl.
*F02D 41/22* (2006.01)
*F01N 3/10* (2006.01)
*F01N 3/20* (2006.01)

(52) U.S. Cl.
CPC ........... *F02D 41/222* (2013.01); *F01N 3/108* (2013.01); *F01N 3/2066* (2013.01);
(Continued)

(58) Field of Classification Search
CPC ............ F01N 13/0093; F01N 2550/00; F01N 2560/026; F01N 2900/1812; F01N 3/035;
(Continued)

(56) References Cited

U.S. PATENT DOCUMENTS 7,987,661 B2    8/2011  Jung
9,010,087 B1 *  4/2015  Upadhyay ............... F01N 11/00
                                                60/277
(Continued)

FOREIGN PATENT DOCUMENTS

CN      1981915 A     6/2007
CN    101344028 A     1/2009
(Continued)

OTHER PUBLICATIONS

DE-102012211703 (Jan. 2014), Pfister et al. machine translation.*
(Continued)

*Primary Examiner* — Hai H Huynh
*Assistant Examiner* — Diem T Tran
(74) *Attorney, Agent, or Firm* — Moore & Van Allen PLLC; W. Kevin Ransom (57) ABSTRACT

The invention relates to a method, system, and computer program product for diagnosing an exhaust gas processing configuration for a combustion engine of a vehicle, said configuration comprising two SCR-units, two NOx-sensors and two reducing agent dosing units suitably arranged, comprising the steps of: performing a series of reducing agent dosing operations by a first reducing agent dosing unit; comparing measured NOx-contents measured by a first NOx-sensor and a second NOx-sensor related to said operations; and if the respective NOx-content measured by the respective NOx-sensors during the performed reducing
(Continued)

agent dosing operations are substantially equal, determining that the respective NOx-sensors provide a proper performance.

16 Claims, 4 Drawing Sheets

(52) U.S. Cl.
CPC .... *F01N 2550/05* (2013.01); *F01N 2560/026* (2013.01); *F01N 2590/08* (2013.01); *F01N 2610/02* (2013.01); *F01N 2900/0416* (2013.01); *F01N 2900/0422* (2013.01); *F01N 2900/1616* (2013.01)

(58) Field of Classification Search
CPC ........ F01N 3/2066; F01N 3/208; F01N 9/007; Y02T 10/12; Y02T 10/40; Y02T 10/24; Y02T 10/47
See application file for complete search history.

(56) References Cited

U.S. PATENT DOCUMENTS

| | | | |
|---|---|---|---|
| 9,132,386 | B2 | 9/2015 | Udd et al. |
| 9,492,788 | B2 | 11/2016 | Gaudin |
| 9,494,096 | B2 | 11/2016 | Pfaffinger |
| 9,593,611 | B2 | 3/2017 | Kawaguchi et al. |
| 9,593,617 | B2 | 3/2017 | Veldten et al. |
| 9,624,804 | B2 | 4/2017 | Matsumoto et al. |
| 9,657,629 | B2 | 5/2017 | Iwatani |
| 10,052,588 | B2 | 8/2018 | Tanioka |
| 2004/0040284 | A1 | 3/2004 | Upadhyay et al. |
| 2005/0103000 | A1 | 5/2005 | Nieuwstadt et al. |
| 2007/0160508 | A1 | 7/2007 | Doumeki et al. |
| 2008/0271437 | A1 | 11/2008 | Matsunaga |
| 2009/0217644 | A1 | 9/2009 | Jung |
| 2009/0277159 | A1 | 11/2009 | Driscoll et al. |
| 2010/0043397 | A1 | 2/2010 | Wang et al. |
| 2010/0218487 | A1* | 9/2010 | Wang ............... F01N 11/005 60/287 |
| 2010/0326051 | A1 | 12/2010 | Busch et al. |
| 2011/0023456 | A1 | 2/2011 | Levijoki et al. |
| 2011/0146239 | A1 | 6/2011 | Handler et al. |
| 2011/0203259 | A1 | 8/2011 | Upadhyay et al. |
| 2012/0096837 | A1 | 4/2012 | Yacoub |
| 2012/0233986 | A1* | 9/2012 | Geveci ............... F01N 13/0093 60/274 |
| 2013/0232958 | A1 | 9/2013 | Ancimer et al. |
| 2013/0298655 | A1 | 11/2013 | Kowalkowski et al. |
| 2013/0319070 | A1 | 12/2013 | Klenk et al. |
| 2013/0338900 | A1* | 12/2013 | Ardanese ............ F02D 41/1465 701/102 |
| 2014/0065041 | A1 | 3/2014 | Szailer et al. |
| 2014/0127100 | A1 | 5/2014 | Gerhart et al. |
| 2014/0223886 | A1 | 8/2014 | Khaled et al. |
| 2014/0373511 | A1* | 12/2014 | Osburn ................. F01N 3/103 60/274 |
| 2015/0040543 | A1 | 2/2015 | Shetney et al. |
| 2015/0209730 | A1 | 7/2015 | Blanckenfiell et al. |
| 2015/0247435 | A1 | 9/2015 | Garimella et al. |
| 2015/0273395 | A1 | 10/2015 | Catalogna et al. |
| 2016/0069243 | A1 | 3/2016 | Hegemann et al. |
| 2016/0186630 | A1 | 6/2016 | Osburn et al. |
| 2017/0051654 | A1 | 2/2017 | Gupta et al. |
| 2017/0122159 | A1 | 5/2017 | Bahrami |
| 2017/0130629 | A1 | 5/2017 | Nagel et al. |

FOREIGN PATENT DOCUMENTS

| | | |
|---|---|---|
| CN | 103764565 A | 4/2014 |
| CN | 104053871 A | 9/2014 |
| CN | 104220710 A | 12/2014 |
| CN | 104343512 A | 2/2015 |
| CN | 104603412 A | 5/2015 |
| CN | 104813002 A | 7/2015 |
| DE | 102007040439 A1 | 3/2009 |
| DE | 102011003084 A1 | 7/2012 |
| DE | 102012211703 A1 | 1/2014 |
| DE | 102013209487 A1 | 11/2014 |
| EP | 2918805 A1 | 9/2015 |
| EP | 2977578 A1 | 1/2016 |
| EP | 3009622 A1 | 4/2016 |
| JP | H09189214 A | 7/1997 |
| JP | 2013130120 A | 4/2016 |
| JP | 2016098682 A | 5/2016 |
| KR | 10-2015-0023931 A | 3/2015 |
| WO | 2014014399 A1 | 1/2014 |
| WO | 2015046276 A1 | 4/2015 |
| WO | 2015115978 A1 | 8/2015 |
| WO | 2016010558 A1 | 1/2016 |

OTHER PUBLICATIONS

International Preliminary Report on Patentability for International Patent Application No. PCT/SE2017/050756 dated Jan. 15, 2019.
International Search Report for International Patent Application No. PCT/SE2017/050756 dated Sep. 26, 2017.
Written Opinion of the International Searching Authority for International Patent Application No. PCT/SE2017/050756 dated Sep. 26, 2017.
Scania CV AB, Korean Application No. 10-2019-7002608, Office Action, dated Mar. 19, 2020.
Scania CV AB, European Application No. 17828063.2, Extended European Search Report, dated Jan. 3, 2020.
Scania CV AB, Chinese Application No. 201780042435.4, First Office Action, dated May 26, 2020.

* cited by examiner

SYSTEM AND A METHOD FOR DIAGNOSING THE PERFORMANCE OF TWO NOX SENSORS IN AN EXHAUST GAS PROCESSING CONFIGURATION COMPRISING TWO SCR UNITS

CROSS-REFERENCE TO RELATED APPLICATIONS

This application is a national stage application (filed under 35 § U.S.C. 371) of PCT/SE2017/050756, filed Jul. 6, 2017 of the same title, which, in turn, claims priority to Swedish Application No. 1651061-2 filed Jul. 14, 2016; the contents of each of which are hereby incorporated by reference.

FIELD OF THE INVENTION

The present invention relates to a method, system, and computer program product for diagnosing an exhaust gas processing configuration for a combustion engine of a vehicle.

BACKGROUND OF THE INVENTION

In emission control systems of heavy vehicles of today two $NO_x$-sensors are commonly used for various purposes. Hereby a first $NO_x$-sensor is arranged upstream of an SCR-unit (Selective Catalytic Reduction) and a second $NO_x$-sensor is arranged downstream of said SCR-unit. Said $NO_x$-sensors are arranged to continuously determine a prevailing content of $NO_x$ of emission gases from a combustion engine and may be used for accurate emission control regarding provision of a reducing agent into said emission gases.

Diagnosis of said $NO_x$-sensors is today troublesome due to inaccuracy, i.e. it may be difficult to isolate a faulty sensor $NO_x$-sensor. Sometimes one $NO_x$-sensor or even both $NO_x$-sensors are exchanged needlessness. Diagnosis of said $NO_x$-sensors may also be troublesome because detected errors may relate to other parameters, such as leaking reducing agent dosing units, faulty sensor installations or crystallization of said reducing agent in said emission control system.

DE102012211703 relates to a system and a method for diagnosing a first $NO_x$-sensor arranged in an SCR-system.

SUMMARY OF THE INVENTION

An object of the present invention is to propose a novel and advantageous method for diagnosing an exhaust gas processing configuration for a combustion engine of a vehicle.

Another object of the invention is to propose a novel and advantageous system and a novel and advantageous computer program for diagnosing an exhaust gas processing configuration for a combustion engine of a vehicle.

Another object of the present invention is to propose a novel and advantageous method providing a cost effective and reliable diagnose of an exhaust gas processing configuration for a combustion engine of a vehicle.

Another object of the invention is to propose a novel and advantageous system and a novel and advantageous computer program providing a cost effective and reliable diagnose of an exhaust gas processing configuration for a combustion engine of a vehicle.

Yet another object of the invention is to propose a method, a system and a computer program achieving a robust, accurate and automated diagnosis of an exhaust gas processing configuration for a combustion engine of a vehicle.

Yet another object of the invention is to propose an alternative method, an alternative system and an alternative computer program for diagnosing an exhaust gas processing configuration for a combustion engine of a vehicle.

Some of these objects are achieved with a method according to claim 1. Other objects are achieved with a system in accordance with what is depicted herein. Advantageous embodiments are depicted in the dependent claims. Substantially the same advantages of method steps of the innovative method hold true for corresponding means of the innovative system.

According to an aspect of the invention there is provided a method for diagnosing an exhaust gas processing configuration for a combustion engine of a vehicle, said configuration comprising a first SCR-unit and a first $NO_x$-sensor arranged downstream said first SCR-unit and a second SCR-unit and a second $NO_x$-sensor arranged downstream said second SCR-unit and a first reducing agent dosing unit arranged upstream said first SCR-unit and a second reducing agent dosing unit arranged between said first SCR-unit and said second SCR-unit, comprising the steps of:

determining whether a predetermined status of said exhaust gas processing configuration is at hand, and if so;

performing a series of reducing agent dosing operations by said first reducing agent dosing unit;

determining an amount of $NO_x$-content measured by means of said first $NO_x$-sensor and said second $NO_x$-sensor for a number of said reducing agent dosing operations;

comparing said $NO_x$-content measured by said first $NO_x$-sensor and said second $NO_x$-sensor; and if the respective $NO_x$-content measured by the respective $NO_x$-sensors during the performed reducing agent dosing operations are substantially equal, considering that the respective $NO_x$-sensors provide a proper performance.

Hereby a reliable and cost effective diagnosis method is provided for an exhaust gas processing configuration for a combustion engine of a vehicle, which configuration comprises two SCR-units arranged in series. Hereby an improved diagnosis method is provided wherein a minimum of inaccurate or faulty $NO_x$-sensor determinations are given. This advantageously reduces risks for unnecessary and false exchanges or maintenance services of relatively expensive $NO_x$-sensors being arranged in said configuration.

If the respective $NO_x$-content measured by the respective $NO_x$-sensors during the performed reducing agent dosing operations are not substantially equal, the method may further comprise the steps of:

determining if one of said $NO_x$-sensors exhibits a non-linear performance with respect to the performed reducing agent dosing operations and the measured $NO_x$-content by the other $NO_x$-sensor with respect to the performed reducing agent dosing operations, and determining if there is an ammonia slip present at said one $NO_x$-sensor, and if so, considering that both $NO_x$-sensors provide a proper performance.

If no ammonia slip at said one $NO_x$-sensor is determined to be present, the method may further comprise the step of:

determining if there is an off-set error associated with said one $NO_x$-sensor.

Hereby an accurate, robust and cost-effective diagnosis method is provided.

If it is determined that there is no off-set error associated with said one $NO_x$-sensor, the method may comprise the step of:

considering that said one $NO_x$-sensor does not provide a proper performance.

Hereby an accurate, robust and cost-effective diagnosis method is provided. Hereby it is possible to identify which $NO_x$-sensor out of the two $NO_x$-sensors is defect.

If it is determined that there is an off-set error associated with said one $NO_x$-sensor and a prior time out regarding reducing agent dosing operations has been performed for said one $NO_x$-sensor, the method may comprise the step of:

considering that said one $NO_x$-sensor does not provide a proper performance.

Hereby an accurate, robust and cost-effective diagnosis method is provided. Hereby it is possible to identify which $NO_x$-sensor out of the two $NO_x$-sensors is defect.

If it is determined that there is an off-set error associated with said one $NO_x$-sensor and a prior time out regarding reducing agent dosing operations has not been performed for said one $NO_x$-sensor, the method may further comprise the step of:

performing a time out regarding reducing agent dosing operations for said one $NO_x$-sensor.

According to one embodiment there is provided a system for diagnosing an exhaust gas processing configuration for a combustion engine of a vehicle, said configuration comprising a first SCR-unit and a first $NO_x$-sensor arranged downstream said first SCR-unit and a second SCR-unit and a second $NO_x$-sensor arranged downstream said second SCR-unit and a first reducing agent dosing unit arranged upstream said first SCR-unit and a second reducing agent dosing unit arranged between said first SCR-unit and said second SCR-unit, comprising:

means arranged for determining whether a predetermined status of said exhaust gas processing configuration is at hand;

means arranged for performing a series of reducing agent dosing operations by said first reducing agent dosing unit;

means arranged for determining an amount of $NO_x$-content measured by means of said first $NO_x$-sensor and said second $NO_x$-sensor for a number of said reducing agent dosing operations;

means arranged for comparing said $NO_x$-content measured by said first $NO_x$-sensor and said second $NO_x$-sensor; and means arranged for considering that the respective $NO_x$-sensors provide a proper performance, if the respective $NO_x$-content measured by the respective $NO_x$-sensors during the performed reducing agent dosing operations are substantially equal.

The system may further comprise:
means arranged for determining if one of said $NO_x$-sensors exhibits a non-linear performance with respect to the performed reducing agent dosing operations and the measured $NO_x$-content by the other $NO_x$-sensor with respect to the performed reducing agent dosing operations;

means arranged for determining if there is an ammonia slip is present at said one $NO_x$-sensor; and means arranged for considering that both $NO_x$-sensors provide a proper performance if there is an ammonia slip present at said one $NO_x$-sensor.

The system may further comprise:
means arranged for determining if there is an off-set error associated with said one $NO_x$-sensor.

The system may further comprise:
means arranged for considering that said one $NO_x$-sensor does not provide a proper performance if it is determined that there is no off-set error associated with said one $NO_x$-sensor.

The system may further comprise:
means arranged for considering that said one $NO_x$-sensor does not provide a proper performance if it is determined that there is an off-set error associated with said one $NO_x$-sensor and a prior time out regarding reducing agent dosing operations has been performed for said one $NO_x$-sensor.

The system may further comprise:
means arranged for performing a time out regarding reducing agent dosing operations for said one $NO_x$-sensor if it is determined that there is an off-set error associated with said one $NO_x$-sensor and a prior time out regarding reducing agent dosing operations has not been performed for said one $NO_x$-sensor.

According to an aspect of the invention there is provided a vehicle comprising a system according to what is presented herein. Said vehicle may be any from among a truck, bus or passenger car. According to an embodiment the system is provided for a marine application or industrial application.

According to an aspect of the invention there is provided a computer program for diagnosing an exhaust gas processing configuration for a combustion engine of a vehicle, wherein said computer program comprises program code for causing an electronic control unit or a computer connected to the electronic control unit to perform anyone of the method steps depicted herein, when run on said electronic control unit or said computer.

According to an aspect of the invention there is provided a computer program for diagnosing an exhaust gas processing configuration for a combustion engine of a vehicle, wherein said computer program comprises program code stored on a computer-readable medium for causing an electronic control unit or a computer connected to the electronic control unit to perform anyone of the method steps depicted herein.

According to an aspect of the invention there is provided a computer program for diagnosing an exhaust gas processing configuration for a combustion engine of a vehicle, wherein said computer program comprises program code stored on a computer-readable medium for causing an electronic control unit or a computer connected to the electronic control unit to perform anyone of the method steps depicted herein, when run on said electronic control unit or said computer.

According to an aspect of the invention there is provided a computer program product containing a program code stored on a computer-readable medium for performing anyone of the method steps depicted herein, when said computer program is run on an electronic control unit or a computer connected to the electronic control unit.

According to an aspect of the invention there is provided a computer program product containing a program code stored non-volatile on a computer-readable medium for performing anyone of the method steps depicted herein, when said computer program is run on an electronic control unit or a computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognize further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and in which.

DETAILED DESCRIPTION OF THE INVENTION

Figure 1:
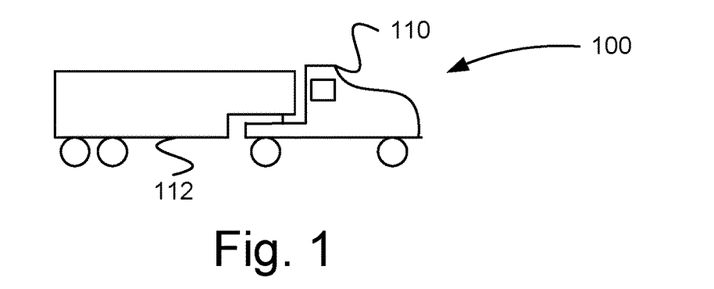
FIG. 1 schematically illustrates a vehicle according to an embodiment of the invention.

FIG. 1 depicts a side view of a vehicle 100. The exemplified vehicle 100 comprises a tractor unit 110 and a trailer 112. The vehicle 100 may be a heavy vehicle, e.g. a truck or a bus. It may alternatively be a car.

It should be noted that the inventive system is applicable to various vehicles, such as e.g. a mining machine, tractor, dumper, wheel-loader, platform comprising an industrial robot, forest machine, earth mover, road construction vehicle, road planner, emergency vehicle or a tracked vehicle.

It should be noted that the invention is suitable for application in various systems comprising a similar setup as depicted herein, namely a combustion engine and an associated emission control system comprising two SCR-units and two $NO_x$-sensors. It should be noted that the invention is suitable for application in any SCR system and is therefore not confined to SCR systems for motor vehicles. The innovative method and the innovative SCR system according to one aspect of the invention are well suited to other platforms which comprise an SCR system than motor vehicles, e.g. watercraft. The watercraft may be of any kind, e.g. motorboats, steamers, ferries or ships.

The innovative method and the innovative system according to one aspect of the invention are also well suited to, for example, systems which comprise industrial combustion engines and/or combustion engine-powered industrial robots and an associated emission control system comprising two SCR-units and two $NO_x$-sensors.

The innovative method and the innovative system according to one aspect of the invention are also well suited to various kinds of power plants, e.g. an electric power plant which comprises a combustion engine-powered generator and an associated emission control system comprising two SCR-units and two $NO_x$-sensors.

The innovative method and the innovative system are also well suited to various combustion engine systems comprising two SCR-catalysts and two $NO_x$-sensors.

The innovative method and the innovative system are well suited to any engine system which comprises an engine, e.g. on a locomotive or some other platform, an associated emission control system comprising two SCR-units and two $NO_x$-sensors.

The innovative method and the innovative SCR system are well suited to any system which comprises a $NO_x$-generator an associated emission control system comprising two SCR-units and two $NO_x$-sensors.

The term "link" refers herein to a communication link which may be a physical connection such as an optoelectronic communication line, or a non-physical connection such as a wireless connection, e.g. a radio link or microwave link.

The term "line" refers herein to a passage for holding and conveying a fluid, e.g. a reducing agent in liquid form. The line may be a pipe of any size and be made of any suitable material, e.g. plastic, rubber or metal.

The term "reductant" or "reducing agent" refers herein to an agent used for reacting with certain emissions in an SCR system. These emissions may for example be $NO_x$ gas. The terms "reductant" and "reducing agent" are herein used synonymously. In one version, said reductant is so-called AdBlue. Other kinds of reductants may of course be used. AdBlue is herein cited as an example of a reductant, but one skilled in the art will appreciate that the innovative method and the innovative system are feasible with other types of reductants, subject to necessary adaptations, in control algorithms in accordance with the innovative method.

Figure 2:
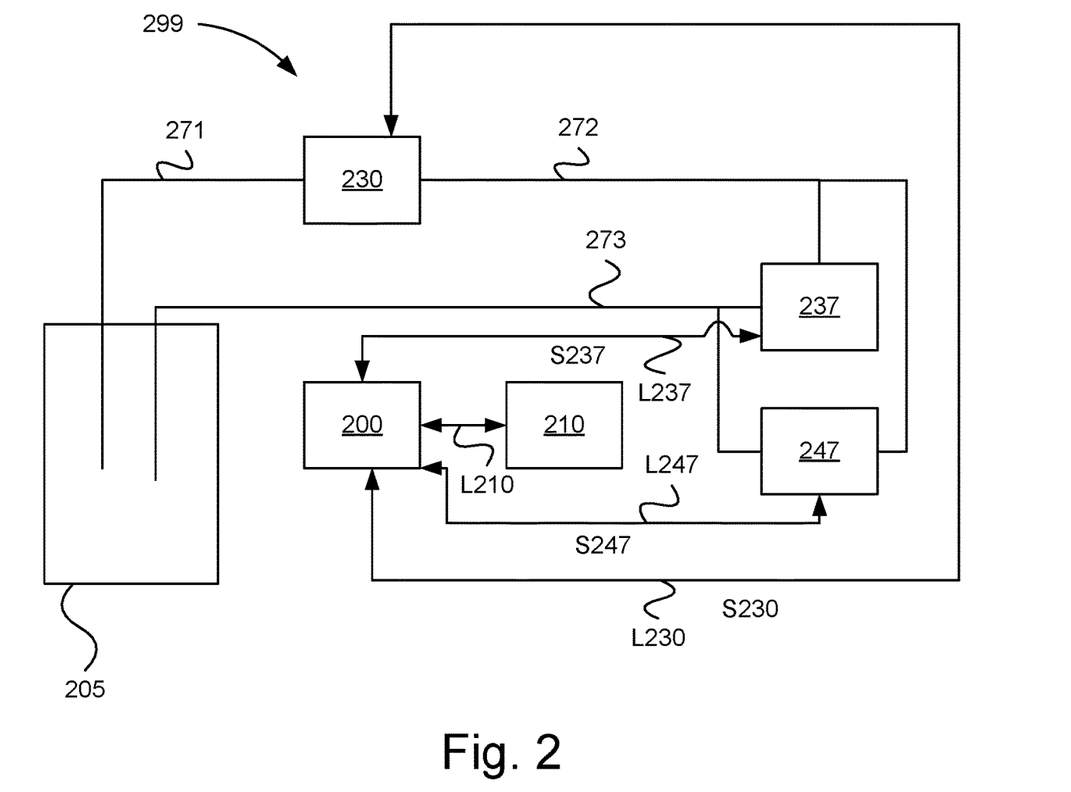
FIG. 2 schematically illustrates a system according to an embodiment of the invention.

FIG. 2 schematically illustrates a system 299 according to an example embodiment of the invention. The system 299 is situated in the tractor unit 110 and may be part of an exhaust gas processing configuration. It comprises in this example a container 205 arranged to hold a reductant. The container 205 is adapted to holding a suitable amount of reductant and also to being replenishable as necessary. The container may be adapted to hold e.g. 75 or 50 litres of reductant.

A first line 271 is provided to lead the reductant to a pump 230 from the container 205. The pump 230 may be any suitable pump. The pump 230 may be arranged to be driven by an electric motor (not depicted). The pump 230 may be adapted to drawing the reductant from the container 205 via the first line 271 and supplying it via a second line 272 to a first dosing unit 237 and a second dosing unit 247. The first dosing unit 237 and the second dosing unit 247 may also be referred to as a first reducing agent dosing unit and a second reducing agent dosing unit, respectively. The first dosing unit 237 and the second dosing unit 247 comprise an electrically controlled dosing valve by means of which a flow of reductant added to the exhaust system can be controlled. The pump 230 is adapted to pressurizing the reductant in the second line 272. The first dosing unit 237 and the second dosing unit 247 are provided with a throttle unit, against which said pressure of the reductant may build up in the system 299.

A first control unit 200 is arranged for communication with the pump 230 via a link L230. The first control unit 200 is arranged to send control signals S230 via said link L230. The first control unit 200 is arranged to control operation of said pump 230 so as to for example adjust flows of the reducing agent within the system 299. The first control unit 200 is arranged to control an operation power of the pump 230 by controlling the electric motor.

The first dosing unit 237 and the second dosing unit 247 are adapted to supplying said reductant to an exhaust system (see FIG. 3) of the vehicle 100. More specifically, it is adapted to supplying a suitable amount of reductant in a controlled way to an exhaust system of the vehicle 100. In this version, two SCR catalysts (see FIG. 3) are situated downstream of respective locations in the exhaust system where the supply of reductant takes place.

A third line 273 running between the first dosing unit 237 and the second dosing unit 247 and the container 205 is adapted to leading back to the container 205 a certain amount of the reductant fed to the first dosing unit 237 and the second dosing unit 247. This configuration results in advantageous cooling of the dosing unit 250. The first dosing unit 237 and the second dosing unit 247 are thus cooled by a flow of the reductant when it is pumped through it from the pump 230 to the container 205.

The first control unit 200 is arranged for communication with the first dosing unit 237 via a link L237. The first control unit 200 is arranged to send control signals S237 via said link L237. The first control unit 200 is arranged to control operation of said first dosing unit 237 so as to for example control dosing of the reducing agent to the exhaust gas system of the vehicle 100. The first control unit 200 is arranged to control operation of the first dosing unit 237 so as to for example adjust return flow of said reducing agent to the container 205.

The first control unit 200 is arranged for communication with the second dosing unit 247 via a link L247. The first control unit 200 is arranged to send control signals S247 via said link L247. The first control unit 200 is arranged to control operation of said second dosing unit 247 so as to for example control dosing of the reducing agent to the exhaust gas system of the vehicle 100. The first control unit 200 is arranged to control operation of the second dosing unit 247 so as to for example adjust return flow of said reducing agent to the container 205.

A second control unit 210 is arranged for communication with the first control unit 200 via a link L210. It may be releasably connected to the first control unit 200. It may be a control unit external to the vehicle 100. It may be adapted to performing the innovative steps according to the invention. It may be used to cross-load software to the first control unit 200, particularly software for applying the innovative method. It may alternatively be arranged for communication with the first control unit 200 via an internal network on board the vehicle. It may be adapted to performing functions corresponding to those of the first control unit 200, such as e.g. comparing $NO_x$-content measured by a first $NO_x$-sensor 243 and a second $NO_x$-sensor 253 (see FIG. 3) and, if the respective $NO_x$-content measured by the respective $NO_x$-sensors during the performed reducing agent dosing operations are substantially equal, considering that the respective $NO_x$-sensors provide a proper performance.

Figure 3:
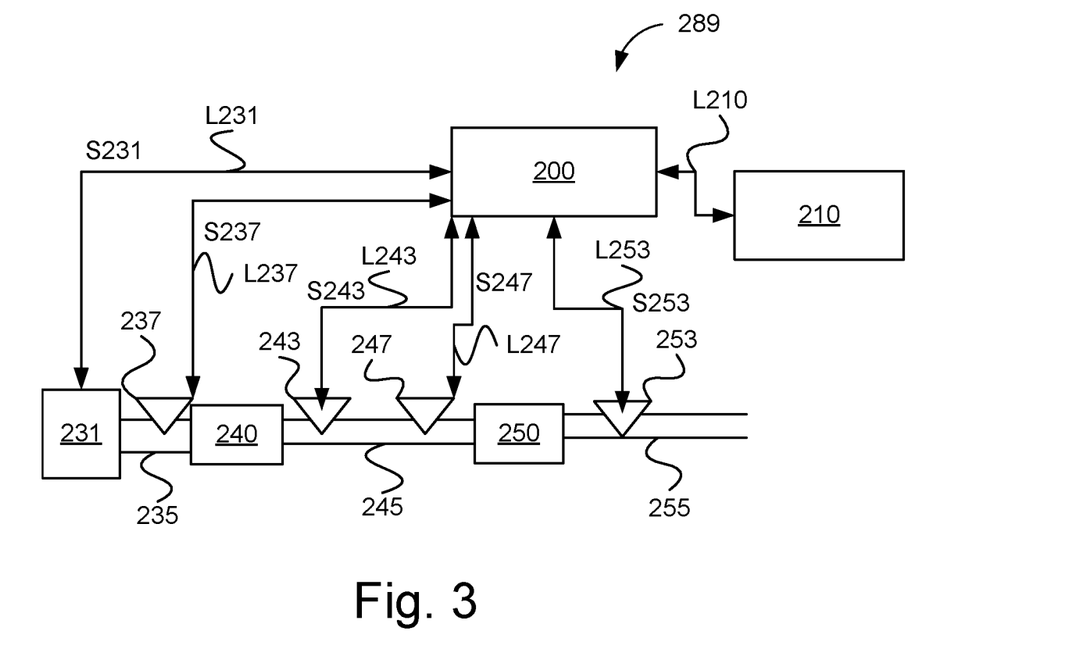
FIG. 3 schematically illustrates a system according to an embodiment of the invention.

FIG. 3 schematically illustrates a system 289 of the vehicle shown i FIG. 1 according to an embodiment of the invention. The system 289 may constitute a part of the inventive system for diagnosing an exhaust gas processing configuration for a combustion engine 231 of a vehicle 100.

The engine 231 is during operation causing an exhaust gas flow which is lead via a first passage 235 to a first SCR catalyst arrangement 240, also denoted first SCR-unit 240.

A second passage 245 is arranged to convey said exhaust gas flow from said first SCR-unit 240 to a second SCR catalyst arrangement 250, also denoted second SCR-unit 250. A third passage 255 is arranged to convey said exhaust gas flow from said second SCR-unit 250 to an environment of the exhaust gas processing configuration.

Said first dosing unit 237 is arranged to provide said reductant to said first passage 235 upstream of said first SCR-unit 240 and downstream of said engine 231. Said second dosing unit 247 is arranged to provide said reductant to said second passage 245 upstream of said second SCR-unit 250 and downstream of said first SCR-unit 240.

The first control unit 200 is arranged to control operation of said first dosing unit 237 so as to dose reducing agent into the first passage 235. The first control unit 200 is arranged to control operation of said second dosing unit 247 so as to dose reducing agent into the second passage 245.

Said first SCR-unit 240 and said second SCR-unit 250 each comprises a vaporizing module (not shown) which is arranged to vaporize said dosed reducing agent so as to achieve a mixture of exhaust gas and reducing agent for treatment by means of an SCR-portion of the respective SCR-units 240, 250. Said vaporizing module may comprise a mixer (not shown) for mixing said vaporized reducing agent with the exhaust gas. Said mixers may be arranged adjacent to said SCR-units, i.e. relatively far down downstream said vaporizing modules. Said vaporizing modules may be formed in any suitable way. Said vaporizing modules are configured to achieve a most effective vaporizing of provided reducing agent as possible. Herein said vaporizing module is providing large surfaces where vaporizing of provided reducing agent may be performed in an effective way. Said vaporizing modules may consist of a metal or a metal alloy.

A first $NO_x$-sensor 243 is arranged upstream said second SCR-unit 250 at said second passage 245. Said first $NO_x$-sensor 243 is arranged for communication with the first control unit 200 via a link L243. The first $NO_x$-sensor 243 is arranged to continuously determine a prevailing first content of $NO_x$, denoted NOx1, in the second passage 245. The first $NO_x$-sensor 243 is arranged to continuously send signals S243 comprising information about the prevailing first content of $NO_x$ to the first control unit 200 via the link L243.

A second $NO_x$-sensor 253 is arranged downstream said second SCR-unit 250 at said third passage 255. Said second $NO_x$-sensor 253 is arranged for communication with the first control unit 200 via a link L253. The second $NO_x$-sensor 253 is arranged to continuously determine a prevailing second content of $NO_x$, denoted NOx2, in the third passage 255. The second $NO_x$-sensor 253 is arranged to continuously send signals S253 comprising information about the prevailing second content of $NO_x$ to the first control unit 200 via the link L253.

Said first $NO_x$-sensor 243 and said second $NO_x$-sensor 253 may be used to provide information about prevailing contents of $NO_x$ in the second passage 245 and the third passage 255, respectively. Hereby said first control unit 200 may be arranged to dose reducing agent into the second passage 245 and into the third passage 255 in a suitable way on the basis of information thereof.

The first control unit 200 is arranged to determine whether a predetermined status of said exhaust gas processing configuration is at hand. This predetermined status may refer to any suitable condition of the vehicle for performing the innovative method. Said predetermined status may for example refer to a prevailing temperature of said first SCR-unit 240 and said second SCR-unit 250. If each of said first SCR-unit 240 and said second SCR-unit 250 has reached a suitable prevailing temperature (operation temperature) it may be determined that predetermined status of said exhaust gas processing configuration is at hand. According to one embodiment it may be determined that predetermined status of said exhaust gas processing configuration is at hand if no relevant automatically generated error codes (also denoted "flags") are present. Thus, it may be determined that predetermined status of said exhaust gas processing configuration is at hand if it is suitable to actually perform the innovative method for diagnosing an exhaust gas processing configuration for a combustion engine of a vehicle.

Said first control unit 200 is arranged to control dosing of said first dosing unit 237 so as to performing a series of reducing agent dosing operations if said predetermined status of said exhaust gas processing configuration is at hand.

Said first control unit 200 is arranged for determining an amount of $NO_x$-content (NOx1, NOx2) measured by means of said first $NO_x$-sensor 243 and said second $NO_x$-sensor 253 for a number of said reducing agent dosing operations. Said first control unit 200 is arranged to store said determined amounts $NO_x$-content (NOx1, NOx2) in a memory thereof for comparison for diagnosis purposes.

Said first control unit 200 is arranged for comparing said $NO_x$-content (NOx1, NOx2) measured by said first $NO_x$-sensor 243 and said second $NO_x$-sensor 253 and, if the respective $NO_x$-content measured by the respective $NO_x$-sensors during the performed reducing agent dosing operations are substantially equal, considering that the respective $NO_x$-sensors provide a proper performance.

Said first control unit 200 is arranged to perform the process steps depicted herein, comprising the process steps which are detailed with reference to FIG. 4b.

Figure 4A:
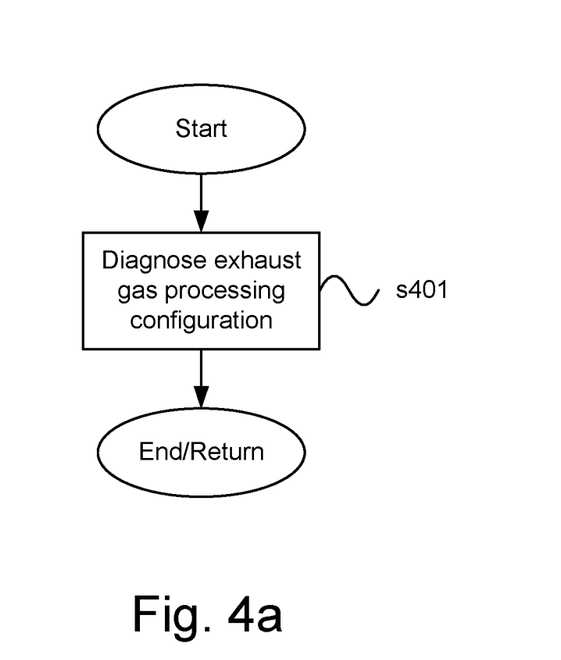
FIG. 4a is a schematic flowchart of a method according to an embodiment of the invention.

FIG. 4a schematically illustrates a flow chart of a method for diagnosing an exhaust gas processing configuration for a combustion engine 231 of a vehicle 100, said configuration comprising a first SCR-unit 240 and a first $NO_x$-sensor 243 arranged downstream said first SCR-unit 240 and a second SCR-unit 250 and a second $NO_x$-sensor 253 arranged downstream said second SCR-unit 250 and a first reducing agent dosing unit 237 arranged upstream said first SCR-unit 240 and a second reducing agent dosing unit 247 arranged between said first SCR-unit 240 and said second SCR-unit 250.

The method comprises a first method step s401. The method step s401 comprises the steps of:
determining whether a predetermined status of said exhaust gas processing configuration is at hand, and if so;
performing a series of reducing agent dosing operations by said first reducing agent dosing unit 237;
determining an amount of $NO_x$-content measured by means of said first $NO_x$-sensor 243 and said second $NO_x$-sensor 253 for a number of said reducing agent dosing operations;
comparing said $NO_x$ content measured by said first $NO_x$-sensor 237 and said second $NO_x$-sensor 247; and
if the respective $NO_x$ content measured by the respective $NO_x$-sensors during the performed reducing agent dosing operations are substantially equal, considering that the respective $NO_x$-sensors provide a proper performance.

After the method step s401 the method ends/is returned.

Figure 4B:
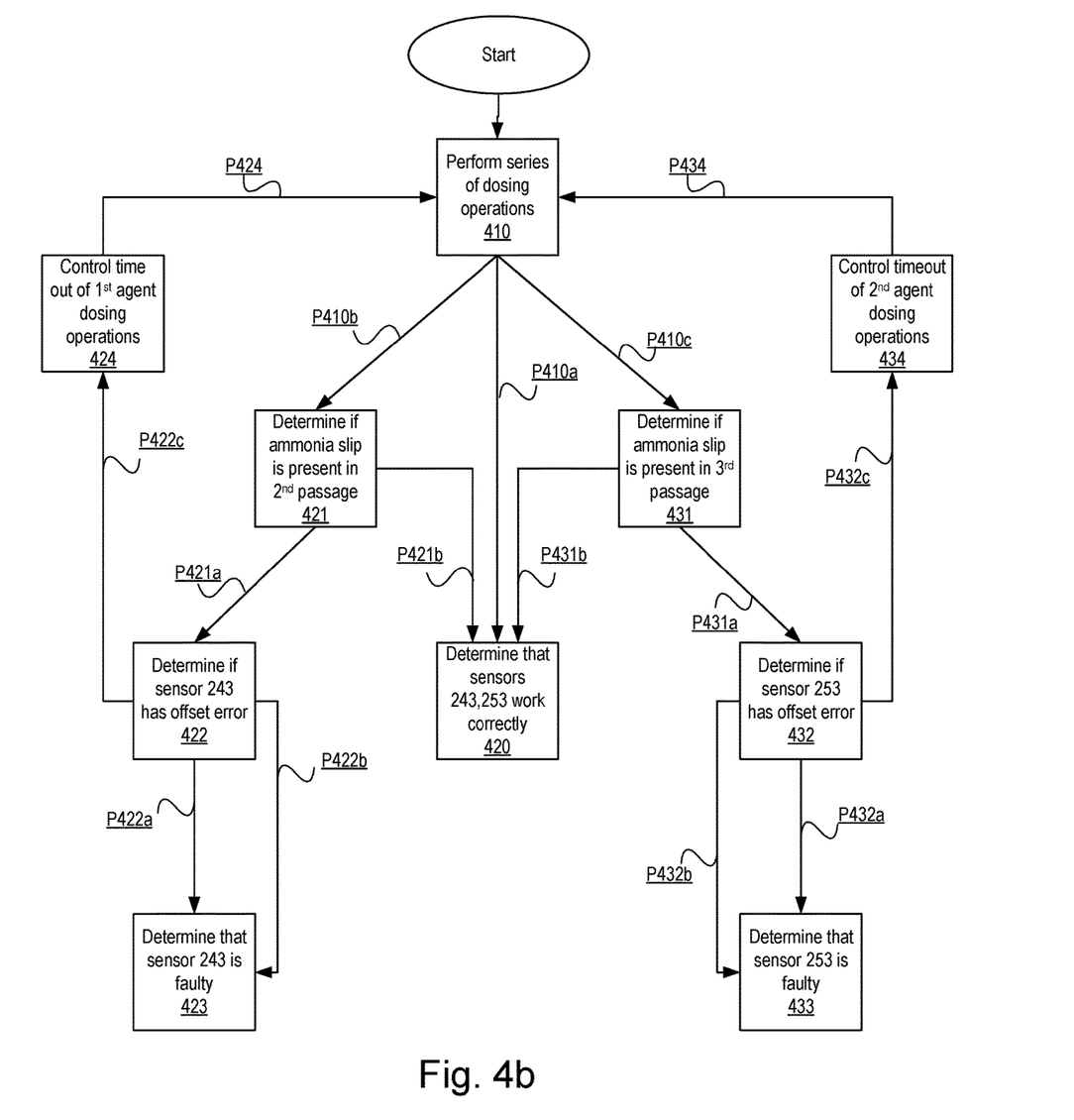
FIG. 4b is a schematic function diagram of a method according to an embodiment of the invention.

FIG. 4b schematically illustrates a function diagram of a method for diagnosing an exhaust gas processing configuration for a combustion engine 231 of a vehicle 100, said configuration comprising a first SCR-unit 240 and a first $NO_x$-sensor 243 arranged downstream said first SCR-unit 240 and a second SCR-unit 250 and a second $NO_x$-sensor 253 arranged downstream said second SCR-unit 250 and a first reducing agent dosing unit 237 arranged upstream said first SCR-unit 240 and a second reducing agent dosing unit 247 arranged between said first SCR-unit 240 and said second SCR-unit 250.

Initially, it is determined whether a predetermined status of said exhaust gas processing configuration is at hand. If said predetermined status of said exhaust gas processing configuration is at hand the inventive method may be activated and a first process step 410 is performed. Said predetermined status may relate to temperatures of said first SCR-unit and said second SCR-unit and/or any other predetermined conditions relating to said exhaust gas processing configuration or the vehicle 100 for providing a suitable state for performing the inventive method according to what is depicted herein.

The first process step 410 comprises the step of dosing reductant by means of said first reducing agent dosing unit 237 only. Hereby a series of reducing agent dosing operations by said first reducing agent dosing unit 237 is performed. Thus, no dosing is performed by means of said second reducing agent dosing unit 247. The first process step 410 comprises the step of continuously measuring said first $NO_x$-content NOx1 by means of said first $NO_x$-sensor 243. The first process step comprises the step of continuously measuring said second $NO_x$-content NOx2 by means of said second $NO_x$-sensor 253. The first process step 410 comprises the step of comparing said first $NO_x$-content NOx1 with a corresponding second $NO_x$-content NOx2 for each dosing operation. Each dosing operation involves dosing of reductant at a determined rate (amount/time unit). According to one example 10 dosing operations are performed. It should however be noted that any suitable number of dosing operations may be performed, e.g. 5, 7, 15 or 20 dosing operations.

If said first $NO_x$-content NOx1 and a corresponding second $NO_x$-content NOx2 for each dosing operation are substantially equal a process path P410a is valid and a subsequent process step 420 is performed.

If said first $NO_x$-content NOx1 and a corresponding second $NO_x$-content NOx2 for each dosing operation are not substantially equal (non-linear) paying regard to amount of dosed reductant and said determined second $NO_x$-content NOx2 a process path P410b is valid and a subsequent process step 421 is performed.

If said second $NO_x$-content NOx2 and a corresponding first $NO_x$-content NOx1 for each dosing operation are not substantially equal (non-linear) paying regard to amount of dosed reductant and said determined first $NO_x$-content NOx1 a process path P410c is valid and a subsequent process step 431 is performed.

The process step 420 comprises the step of determining that both said first $NO_x$-sensor 243 and said second $NO_x$-sensor 253 work correctly, i.e. that the first $NO_x$-sensor 243 and said second $NO_x$-sensor 253 provide proper performance.

The process step 421 comprises the step of determining if there is an ammonia slip present in the second passage 245, i.e. downstream of said first SCR-unit 240. This may be performed in any suitable manner. According to one example a first ammonia sensor (not shown) may be arranged at the second passage 245 and being arranged for communication with the first control unit 200 via a link (not shown). Said first ammonia sensor is arranged to measure an ammonia content in said second passage 245. According to another example said first $NO_x$-sensor 243 may be used for detecting presence of ammonia in said second passage 245, and thus detecting an ammonia slip from said first SCR-unit 240. $NO_x$-sensors may to some extent be cross sensitive to ammonia and this may be used accordingly.

If no ammonia slip in the second passage 245 is present a process path P421a is valid and a subsequent process step 422 is performed.

If an ammonia slip in the second passage 245 is present a process path P421b is valid and said process step 420 is performed.

The process step 422 comprises the step of determining if there is a significant offset error associated with the first $NO_x$-sensor 243. This may be performed in any suitable way. According to one example said measured first $NO_x$-content NOx1 and said second $NO_x$-content NOx2 are compared during a reducing agent dosing operation comprising dosing by the first reducing agent dosing unit 237 only. Hereby said first $NO_x$-content NOx1 and said second $NO_x$-content NOx2 are determined, and compared, at steps of 5% between 0% and 100% of reducing agent provision, wherein 100% corresponds to a predetermined maximum reducing agent provision and 0% corresponds to no reducing agent provision. According to a variant the reducing agent dosing operation is interrupted if substantially 0 ppm $NO_x$ is detected by said first $NO_x$-sensor 243 and said second $NO_x$-sensor 253.

Hereby it is assumed that said first $NO_x$-content NOx1=x+a and said second $NO_x$-content NOx2=x+b for each of said dosing operation point (21 points according to this example). Hereby x corresponds to remaining $NO_x$-content due to said dosing and katalytic reaction in SCR-units. Hereby a relates to a possible off-set of the first $NO_x$-sensor 243 and b relates to a possible off-set of the second $NO_x$-sensor 253.

Alternative 1: If b is a value close to zero (0), it is assumed that the off-set value for the first $NO_x$-sensor 243 is equal to a. If the value a-b is larger than a predetermined threshold value, e.g. 30 ppm, it is determined that said first first $NO_x$-sensor 243 is associated with a significant offset error.

Alternative 2: If a is a value close to zero (0), it is assumed that the off-set value for the second $NO_x$-sensor 253 is equal to b. If the value b-a is larger than a predetermined threshold value, e.g. 30 ppm, it is determined that said second $NO_x$-sensor 253 is associated with a significant offset error.

If it is determined that there is a significant offset error associated with the first $NO_x$-sensor 243 and that there has been a previous actively controlled time out regarding dosing operations of said first reducing agent dosing unit 237 according to the inventive method (process step 424) a process path P422a is valid and a subsequent process step 423 is performed.

If it is determined that there is not a significant offset error associated with the first $NO_x$-sensor 243 a process path P422b is valid and said subsequent process step 423 is performed.

If it is determined that there is a significant offset error associated with the first $NO_x$-sensor 243 and that there has not been a previous actively controlled time out regarding dosing operations of said first reducing agent dosing unit 237 according to the inventive method (process step 424) a process path P422c is valid and a subsequent process step 424 is performed.

The process step 423 comprises the step of determining that the first $NO_x$-sensor 243 does not provide proper performance, i.e. the first $NO_x$-sensor 243 is in some way faulty.

The process step 424 comprises the step of actively controlling a time out regarding dosing operations of said first reducing agent dosing unit 237 for a predetermined time period. After said predetermined time period has lapsed a process path P424 is valid and the process step 410 is performed.

The process step 431 comprises the step of determining if there is an ammonia slip present in the third passage 255, i.e. downstream of said second SCR-unit 250. This may be performed in any suitable manner. Hereby said second reducing agent dosing unit 247 only may be used for provision of said reductant so as to determine if there is an ammonia slip present in the third passage 255. According to one example a second ammonia sensor (not shown) may be arranged at the third passage 255 and being arranged for communication with the first control unit 200 via a link (not shown). Said second ammonia sensor is arranged to measure an ammonia content in said third passage 255. According to another example said second $NO_x$-sensor 253 may be used for detecting presence of ammonia in said third passage 255, and thus detecting an ammonia slip from said second SCR-unit 250.

If no ammonia slip in the third passage 255 is present a process path P231a is valid and a subsequent process step 432 is performed.

If an ammonia slip in the third passage 255 is present a process path P231b is valid and said process step 420 is performed.

The process step 432 comprises the step of determining if there is an offset error associated with the second $NO_x$-sensor 253. This may be performed in any suitable way.

According to one example said measured first $NO_x$-content NOx1 and said second $NO_x$-content NOx2 are compared during a reducing agent dosing operation comprising dosing by the first reducing agent dosing unit 237 only. Hereby said first $NO_x$-content NOx1 and said second $NO_x$-content NOx2 are determined, and compared, at steps of 5% between 0% and 100% of reducing agent provision, wherein 100% corresponds to a predetermined maximum reducing agent provision and 0% corresponds to no reducing agent provision. According to a variant the reducing agent dosing operation is interrupted if substantially 0 ppm $NO_x$ is detected by said first $NO_x$-sensor 243 and said second $NO_x$-sensor 253.

Hereby it is assumed that said first $NO_x$-content NOx1=x+a and said second $NO_x$-content NOx2=x+b for each of said dosing operation point (21 points according to this example). Hereby x corresponds to remaining $NO_x$-content due to said dosing and katalytic reaction in SCR-units. Hereby a relates to a possible off-set of the first $NO_x$-sensor 243 and b relates to a possible off-set of the second $NO_x$-sensor 253.

Alternative 1: If b is a value close to zero (0), it is assumed that the off-set value for the first $NO_x$-sensor 243 is equal to a. If the value a-b is larger than a predetermined threshold value, e.g. 30 ppm, it is determined that said first first $NO_x$-sensor 243 is associated with a significant offset error.

Alternative 2: If a is a value close to zero (0), it is assumed that the off-set value for the second $NO_x$-sensor 253 is equal to b. If the value b-a is larger than a predetermined threshold value, e.g. 30 ppm, it is determined that said second $NO_x$-sensor 253 is associated with a significant offset error.

If it is determined that there is a significant offset error associated with the second $NO_x$-sensor 253 and that there has been a previous actively controlled time out regarding dosing operations of said second reducing agent dosing unit 247 according to the inventive method (process step 434) a process path P432a is valid and a subsequent process step 433 is performed.

If it is determined that there is not a significant offset error associated with the second $NO_x$-sensor 253 a process path P432b is valid and said subsequent process step 433 is performed.

If it is determined that there is a significant offset error associated with the second $NO_x$-sensor 253 and that there has not been a previous actively controlled time out regarding dosing operations of said second reducing agent dosing unit 247 according to the inventive method (process step 434) a process path P432c is valid and a subsequent process step 434 is performed.

The process step 433 comprises the step of determining that the second $NO_x$-sensor 253 does not provide proper performance, i.e. the second $NO_x$-sensor 253 is in some way faulty.

The process step 434 comprises the step of actively controlling a time out regarding dosing operations of said second reducing agent dosing unit 247 for a predetermined time period. After said predetermined time period has lapsed a process path P434 is valid and the process step 410 is performed.

Figure 5:
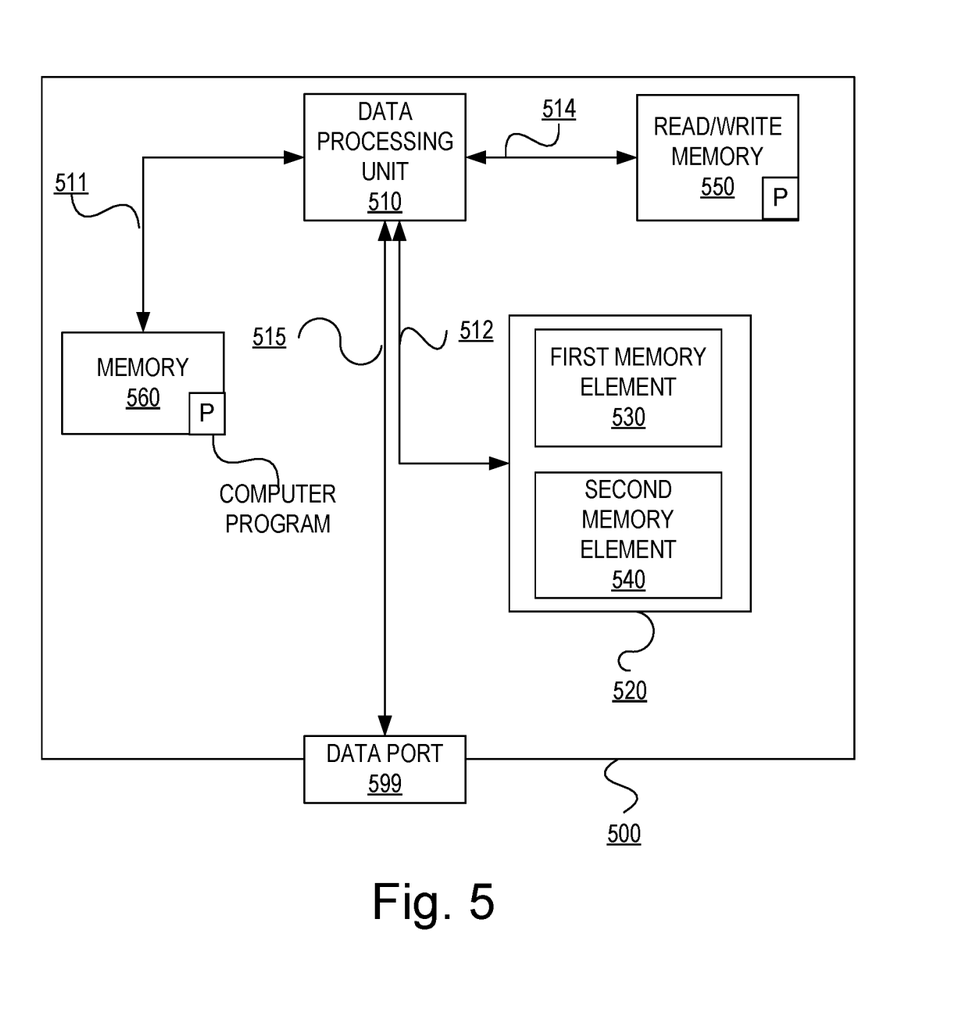
FIG. 5 schematically illustrates a computer according to an embodiment of the invention.

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for diagnosing an exhaust gas processing configuration for a combustion engine 231 of a vehicle 100, said configuration comprising a first SCR-unit 240 and a first $NO_x$-sensor 243 arranged downstream said first SCR-unit 240 and a second SCR-unit 250 and a second $NO_x$-sensor 253 arranged downstream said second SCR-unit 250 and a first reducing agent dosing unit 237 arranged upstream said first SCR-unit 240 and a second reducing agent dosing unit 247 arranged between said first SCR-unit 240 and said second SCR-unit 250.

The computer program P may comprise routines for determining whether a predetermined status of said exhaust gas processing configuration is at hand. If it is determined that said predetermined status of said exhaust gas processing configuration is at hand the innovative method is activated/performed, and a number of subsequent routines of the computer program are performed.

The computer program P may comprise routines for controlling performing a series of reducing agent dosing operations by said first reducing agent dosing unit 237;

The computer program P may comprise routines for determining an amount of $NO_x$-content (NOx1, NOx2) measured by means of said first $NO_x$-sensor 243 and said second $NO_x$-sensor 253 for a number of said reducing agent dosing operations.

The computer program P may comprise routines for comparing said $NO_x$-content (NOx1, NOx2) measured by said first $NO_x$-sensor 243 and said second $NO_x$-sensor 253.

The computer program P may comprise routines for, if the respective $NO_x$-content measured by the respective $NO_x$-sensors during the performed reducing agent dosing operations are substantially equal, considering that the respective $NO_x$-sensors provide a proper performance.

The computer program P may comprise routines for, if the respective $NO_x$-content measured by the respective $NO_x$-sensors during the performed reducing agent dosing operations are not substantially equal, determining if one of said $NO_x$-sensors exhibits a non-linear performance with respect to the performed reducing agent dosing operations and the measured $NO_x$-content by the other $NO_x$-sensor with respect to the performed reducing agent dosing operations.

The computer program P may comprise routines for determining if there is an ammonia slip present at said one $NO_x$-sensor, and if so, considering that both $NO_x$-sensors provide a proper performance.

The computer program P may comprise routines for, if no ammonia slip at said one $NO_x$-sensor is determined to be present, determining if there is an off-set error associated with said one $NO_x$-sensor.

The computer program P may comprise routines for, if it is determined that there is no off-set error associated with said one $NO_x$-sensor, considering that said one $NO_x$-sensor does not provide a proper performance.

The computer program P may comprise routines for, if it is determined that there is an off-set error associated with said one $NO_x$-sensor and a prior time out regarding reducing agent dosing operations has been performed for said one $NO_x$-sensor, considering that said one $NO_x$-sensor does not provide a proper performance.

The computer program P may comprise routines for, if it is determined that there is an off-set error associated with said one $NO_x$-sensor and a prior time out regarding reducing agent dosing operations has not been performed for said one $NO_x$-sensor, performing a time out regarding reducing agent dosing operations for said one $NO_x$-sensor.

The computer program P may comprise routines for performing any of the process steps detailed with reference to FIG. 4b.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L230, L231, L237, L243, L247, and L253, for example, may be connected to the data port 599 (see FIG. 2 and FIG. 3).

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, method steps and process steps herein described are executed.

It should be noted that the system 289 may comprise further components than mentioned above. The system 289 may e.g. comprise at least one Diesel Oxidation Catalyst (DOC). The system 289 may e.g. comprise at least one Diesel Particulate Filter (DPF). The system 289 may e.g. comprise at least one Ammonia Slip Catalyst (ASC). Examples of such designs are disclosed, for example, in the International patent applications PCT/SE2015/050220 and PCT/SE2015/050223. With regard to such system designs, operation according to the invention may still be carried out in the same manner.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The components and features specified above may within the framework of the invention be combined between different embodiments specified.

The invention claimed is:

1. A method for diagnosing an exhaust gas processing configuration for a combustion engine of a vehicle, said configuration comprising a first SCR-unit and a first $NO_x$-sensor arranged downstream said first SCR-unit and a second SCR-unit and a second $NO_x$-sensor arranged downstream said second SCR-unit and a first reducing agent dosing unit arranged upstream said first SCR-unit and a second reducing agent dosing unit arranged between said first SCR-unit and said second SCR-unit, said method comprising:
   determining whether a predetermined status of said exhaust gas processing configuration is at hand, and if so;
   performing a series of reducing agent dosing operations by said first reducing agent dosing unit;
   determining an amount of $NO_x$-content measured by means of said first $NO_x$-sensor and said second $NO_x$-sensor for a number of said reducing agent dosing operations;
   comparing said $NO_x$-content measured by said first $NO_x$-sensor and said second $NO_x$-sensor;
   if the respective $NO_x$-content measured by the respective $NO_x$-sensors during the performed reducing agent dosing operations are substantially equal, determining that the respective $NO_x$-sensors provide a proper performance; and
   if the respective NO-content measured by the respective $NO_x$-sensors during the performed reducing agent dosing operations are not substantially equal, the method further comprises:
      determining if one of said $NO_x$-sensors exhibits a non-linear performance with respect to the performed reducing agent dosing operations and the measured $NO_x$-content by the other $NO_x$-sensor with respect to the performed reducing agent dosing operations; and
      determining if there is an ammonia slip present at said one $NO_x$-sensor that exhibits a non-linear performance, and if so,
      determining that both $NO_x$-sensors provide a proper performance.

2. The method according to claim 1, if no ammonia slip at said one $NO_x$-sensor is determined to be present, the method further comprises:
   determining if there is an off-set error associated with said one $NO_x$-sensor.

3. The method according to claim 2, if it is determined that there is no off-set error associated with said one $NO_x$-sensor, the method further comprises:
   determining that said one $NO_x$-sensor does not provide a proper performance.

4. The method according to claim 2, if it is determined that there is an off-set error associated with said one $NO_x$-sensor and a prior time out regarding reducing agent dosing operations has been performed for said one $NO_x$-sensor, the method further comprises:
   determining that said one $NO_x$-sensor does not provide a proper performance.

5. The method according to claim 2, if it is determined that there is an off-set error associated with said one $NO_x$-sensor and a prior time out regarding reducing agent dosing operations has not been performed for said one $NO_x$-sensor, the method further comprises:
   performing a time out regarding reducing agent dosing operations for said one $NO_x$-sensor.

6. A system for diagnosing an exhaust gas processing configuration for a combustion engine of a vehicle, said configuration comprising a first SCR-unit and a first $NO_x$-sensor arranged downstream said first SCR-unit and a second SCR-unit and a second $NO_x$-sensor arranged downstream said second SCR-unit and a first reducing agent dosing unit arranged upstream said first SCR-unit and a second reducing agent dosing unit arranged between said first SCR-unit and said second SCR-unit, comprising:
   means arranged for determining whether a predetermined status of said exhaust gas processing configuration is at hand;
   means arranged for performing a series of reducing agent dosing operations by said first reducing agent dosing unit;
   means arranged for determining an amount of $NO_x$-content measured by means of said first $NO_x$-sensor and said second $NO_x$-sensor for a number of said reducing agent dosing operations;
   means arranged for comparing said $NO_x$-content measured by said first $NO_x$-sensor and said second $NO_x$-sensor;
   means arranged for determining that the respective $NO_x$-sensors provide a proper performance, if the respective $NO_x$-content measured by the respective $NO_x$ sensors during the performed reducing agent dosing operations are substantially equal;
   means arranged for determining if one of said $NO_x$-sensors exhibits a non-linear performance with respect to the performed reducing agent dosing operations and the measured $NO_x$-content by the other $NO_x$-sensor with respect to the performed reducing agent dosing operations;
   means arranged for determining if there is an ammonia slip is present at said one NO-sensor that exhibits a non-linear performance; and
   means arranged for determining that both NO-sensors provide a proper performance if there is an ammonia slip present at said one $NO_x$-sensor.

7. The system according to claim 6, further comprising: means arranged for determining if there is an off-set error associated with said one $NO_x$-sensor.

8. The system according to claim 7, further comprising:
means arranged for determining that said one $NO_x$-sensor does not provide a proper performance if it is determined that there is no off-set error associated with said one $NO_x$-sensor.

9. The system according to claim 7, further comprising:
means arranged for determining that said one $NO_x$-sensor does not provide a proper performance, if it is determined that there is an off-set error associated with said one $NO_x$-sensor and a prior time out regarding reducing agent dosing operations has been performed for said one $NO_x$-sensor.

10. The system according to claim 7, further comprising:
means arranged for performing a time out regarding reducing agent dosing operations for said one $NO_x$-sensor if it is determined that there is an off-set error associated with said one $NO_x$-sensor and a prior time out regarding reducing agent dosing operations has not been performed for said one $NO_x$-sensor.

11. A vehicle comprising a system for diagnosing an exhaust gas processing configuration for a combustion engine of a vehicle, said configuration comprising a first SCR-unit and a first $NO_x$-sensor arranged downstream said first SCR-unit and a second SCR-unit and a second $NO_x$-sensor arranged downstream said second SCR-unit and a first reducing agent dosing unit arranged upstream said first SCR-unit and a second reducing agent dosing unit arranged between said first SCR-unit and said second SCR-unit, comprising:
means arranged for determining whether a predetermined status of said exhaust gas processing configuration is at hand;
means arranged for performing a series of reducing agent dosing operations by said first reducing agent dosing unit;
means arranged for determining an amount of $NO_x$-content measured by means of said first $NO_x$-sensor and said second $NO_x$-sensor for a number of said reducing agent dosing operations;
means arranged for comparing said $NO_x$-content measured by said first $NO_x$-sensor and said second $NO_x$-sensor;
means arranged for determining that the respective $NO_x$-sensors provide a proper performance, if the respective $NO_x$-content measured by the respective $NO_x$ sensors during the performed reducing agent dosing operations are substantially equal;
means arranged for determining if one of said $NO_x$-sensors exhibits a non-linear performance with respect to the performed reducing agent dosing operations and the measured $NO_x$-content by the other $NO_x$-sensor with respect to the performed reducing agent dosing operations;
means arranged for determining if there is an ammonia slip is present at said one $NO_x$-sensor that exhibits a non-linear performance; and
means arranged for determining that both NO-sensors provide a proper performance if there is an ammonia slip present at said one $NO_x$-sensor.

12. The vehicle according to claim 11, wherein said vehicle is one of a truck, bus or passenger car.

13. The vehicle according to claim 11, wherein said system further comprises:
means arranged for determining if there is an off-set error associated with said one $NO_x$-sensor.

14. The vehicle according to claim 11, wherein said system further comprises:
means arranged for determining that said one $NO_x$-sensor does not provide a proper performance if it is determined that there is no off-set error associated with said one $NO_x$-sensor.

15. A computer program product stored on a non-transitory computer-readable medium, said computer program product for diagnosing an exhaust gas processing configuration for a combustion engine of a vehicle, said configuration comprising a first SCR-unit and a first $NO_x$-sensor arranged downstream said first SCR-unit and a second SCR-unit and a second $NO_x$-sensor arranged downstream said second SCR-unit and a first reducing agent dosing unit arranged upstream said first SCR-unit and a second reducing agent dosing unit arranged between said first SCR-unit and said second SCR-unit, said computer program product comprising computer instructions to cause one or more electronic control units or computers to perform the following operations:
determining whether a predetermined status of said exhaust gas processing configuration is at hand, and if so;
performing a series of reducing agent dosing operations by said first reducing agent dosing unit;
determining an amount of $NO_x$-content measured by means of said first $NO_x$-sensor and said second $NO_x$-sensor for a number of said reducing agent dosing operations;
comparing said $NO_x$-content measured by said first $NO_x$-sensor and said second $NO_x$-sensor;
if the respective $NO_x$-content measured by the respective $NO_x$-sensors during the performed reducing agent dosing operations are substantially equal, determining that the respective $NO_x$-sensors provide a proper performance; and
if the respective $NO_x$-content measured by the respective $NO_x$-sensors during the performed reducing agent dosing operations are not substantially equal, the computer program product further comprises computer instructions to cause one or more electronic control units or computers to perform the following operations:
determining if one of said NO-sensors exhibits a non-linear performance with respect to the performed reducing agent dosing operations and the measured $NO_x$-content by the other $NO_x$-sensor with respect to the performed reducing agent dosing operations; and
determining if there is an ammonia slip present at said one $NO_x$-sensor that exhibits a non-linear performance, and if so,
determining that both NO-sensors provide a proper performance.

16. The computer program product according to claim 15, if no ammonia slip at said one $NO_x$-sensor is determined to be present, the computer program product further comprises computer instructions to cause one or more electronic control units or computers to perform:
determining if there is an off-set error associated with said one $NO_x$-sensor.

* * * * *

UNITED STATES PATENT AND TRADEMARK OFFICE
CERTIFICATE OF CORRECTION

PATENT NO. : 11,174,810 B2
APPLICATION NO. : 16/316304
DATED : November 16, 2021
INVENTOR(S) : Joakim Sommansson et al.

It is certified that error appears in the above-identified patent and that said Letters Patent is hereby corrected as shown below:

In the Claims

In Column 15, Claim 1, Line 53, "NO-content" should read -- $NO_x$-content --,

In Column 16, Claim 6, Line 59, "NO-sensor" should read -- $NO_x$-sensor --,

In Column 16, Claim 6, Line 61, "NO-sensors" should read -- $NO_x$-sensors --,

In Column 17, Claim 11, Line 57, "NO-sensors" should read -- $NO_x$-sensors --,

In Column 18, Claim 15, Line 47, "NO-sensors" should read -- $NO_x$-sensors --,

In Column 18, Claim 15, Line 55, "NO-sensors" should read -- $NO_x$-sensors --.

Signed and Sealed this
Eighth Day of November, 2022

Katherine Kelly Vidal
*Director of the United States Patent and Trademark Office*